(12) United States Patent
Voisine et al.

(10) Patent No.: US 6,747,446 B1
(45) Date of Patent: Jun. 8, 2004

(54) ARRANGEMENT FOR PROVIDING EXTERNAL ACCESS TO FUNCTIONALITY SWITCHES IN A UTILITY METER

(75) Inventors: John T. Voisine, Lafayette, IN (US); Ronald C. Tate, Battleground, IN (US)

(73) Assignee: Landis+Gyr Inc., Lafayette, IN (US)

( * ) Notice: Subject to any disclaimer, the term of this patent is extended or adjusted under 35 U.S.C. 154(b) by 0 days.

(21) Appl. No.: 09/595,969

(22) Filed: Jun. 19, 2000

Related U.S. Application Data

(60) Provisional application No. 60/155,997, filed on Sep. 24, 1999.

(51) Int. Cl.⁷ .................................................. G01R 1/04
(52) U.S. Cl. ....................................... 324/156; 324/142
(58) Field of Search ................................. 324/156, 157, 324/142, 116, 96, 110, 74

(56) References Cited

U.S. PATENT DOCUMENTS

| | | | |
|---|---|---|---|
| 3,559,052 A | | 1/1971 | Fathauer |
| 4,091,670 A | | 5/1978 | Mantoux |
| 5,214,587 A | * | 5/1993 | Green .................. 364/464.04 |
| 5,296,803 A | * | 3/1994 | Kirby et al. ................ 324/156 |
| 5,495,167 A | | 2/1996 | Cotroneo |
| 5,514,959 A | | 5/1996 | Horan et al. |
| 5,598,469 A | | 1/1997 | Preker |
| 5,664,202 A | | 9/1997 | Chen et al. |
| 5,729,221 A | | 3/1998 | Krolopp et al. |
| 5,758,081 A | | 5/1998 | Aytac |
| 5,861,742 A | | 1/1999 | Miller et al. |

FOREIGN PATENT DOCUMENTS

DE         26 30 608         1/1978

* cited by examiner

*Primary Examiner*—N. Le
*Assistant Examiner*—S Zaveri
(74) *Attorney, Agent, or Firm*—Maginot, Moore & Beck

(57) ABSTRACT

An arrangement for providing external access to functionality switches in a utility meter includes a housing, a number of contacts, at least one button actuator, and a hatch. The housing has a base and a cover that includes at least one switch access opening. The number of contacts are disposed on a substrate that is disposed between said cover and said base. The at least one button actuator is configured to electrically connect at least two of said number of contacts such that the at least one button actuator is accessible via said at least one switch access opening. The hatch disposed on said cover and adapted to selectively provide external access to said at least one switch access opening.

23 Claims, 3 Drawing Sheets

ARRANGEMENT FOR PROVIDING EXTERNAL ACCESS TO FUNCTIONALITY SWITCHES IN A UTILITY METER

This application claims the benefit of U.S. Provisional Patent Application No. 60/155,997, filed Sep. 24, 1999.

FIELD OF THE INVENTION

The present invention relates to utility meters and, more particularly, to a utility meter having externally accessible functionality switches.

DESCRIPTION OF THE PRIOR ART

Utility meters are commonplace with regard to measuring utility or commodity consumption or usage (e.g. electricity, gas, water, and the like). Such utility meters are typically interposed between the source of the utility and the usage point. More particularly, a utility meter is generally located proximate to the area of usage of the commodity and, in the case of an electricity meter, is typically mounted on a side of the structure in which the electrical energy is consumed.

There are many types and varieties of electricity meter, including those that measure kilowatt-hours only, and those that have expanded capability to measure and/or calculate demand or time of use. Various other quantities are either measured and/or calculated from the measure parameters. Meters of such expanded capabilities often require some degree of functional control by utility personnel. To this end, switches on the meter provide a degree of control over the measurement and data gathering for the various measured parameters. For example, meter switches provide the capability of resetting the demand reading, performing test functions and scrolling through software features shown on display associated with the utility meter. Meter switches have historically been located internally within the meter to protect the switches and other meter circuitry from exposure to environmental conditions and tampering. More particularly, meter switches are typically located under the cover of the meter. As a result, the cover must be removed to manipulate the various switches. While placement of the switches under the meter cover protects the switches from environmental conditions and tampering, the requirement of removing the meter cover to access the switches contributes to the inconvenience and potential danger associated with performing the operations associated with the switches.

Some meter designs employ switch mechanisms that are accessible without removing the cover. However, to maintain protection from environmental and tamper concerns, most such meters embody complex switch assemblies with many individual component parts that are cumbersome, expensive, and/or difficult to operate. Particularly, in the case of electricity meters, mechanical levers, plunger or twist-and-push type switches that have many individual parts are used to perform the various functions described above.

One such meter is shown in U.S. Pat. No. 5,861,742 entitled Electric Meter Cover issued to Miller et al. on Jan. 19, 1999. The '742 patent discloses an electricity meter cover having a demand reset switch structure that is accessible external to the meter cover. The reset switch structure includes a lockable, pivoting latch that is external of the cover and coupled to a plunger. The plunger is internal to the cover and is adapted to contact an internal switch when the latch is correctly positioned and depressed. Thus, to effectuate the demand reset, the latch must be unlocked, pivoted upwardly, and then depressed. One drawback to the switch of the Miller et al. patent is the mechanical complexity involved in providing the externally accessible switching function. Because of the mechanical complexity, it is impractical to incorporate multiple switches that are externally accessible. In particular, to incorporate multiple switches, the latch and plunger mechanism must be repeated for each switch. Moreover, as exemplified in the '742 patent, most switch structures for utility meters are made of metal or plastic and incorporate elaborate and complicated ways of sealing against rain, dust, and dirt. Such structures further add to the complexity of the switches. Additionally, metal parts often corrode in harsh environmental conditions and their appearance is considerably comprised.

It would thus be desirable to have a device that provides externally accessible switching functionality that has a structure of less complexity than the prior art. Such a device may facilitate the incorporation of multiple externally accessible switches in the utility meter. In any event, such a device can increase reliability and decrease the cost of providing externally accessible switching functionality.

SUMMARY OF THE INVENTION

The present invention includes an arrangement for providing external access to functionality switches in a utility meter that includes externally accessible meter function button-actuated switches covered by a hatch. Inclusion of button-actuated switches covered by a hatch allows for relatively simple assembly and use of a meter having external access switches while accomplishing the necessary tamper and environmental sealing.

According to one embodiment, a utility meter includes an arrangement for providing external access to functionality switches in a utility meter. The arrangement includes a housing, a number of contacts, at least one button actuator, and a hatch. The housing has a base and a cover that includes at least one switch access opening. The number of contacts are disposed on a substrate that is disposed between said cover and said base. The at least one button actuator is configured to electrically connect at least two of said number of contacts such that the at least one button actuator is accessible via said at least one switch access opening. The hatch disposed on said cover and adapted to selectively provide external access to said at least one switch access opening.

Preferably, a plurality button actuators are formed on an elastomeric button pad. Each button actuator includes a conducting disk that is adapted to complete the electrical circuit between a pair of contacts upon actuation of the button. The elastomeric button pad also preferably includes a sealing ridge that is compressed between the cover and the printed wiring board to effect an environmental seal for the internal components of the meter. The hatch is preferably pivotally coupled to the cover.

As a result, the present utility meter provides external access to a plurality of meter function switches while providing protection for the components of the meter against environmental factors.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The embodiments of the invention set out herein are merely exemplary and are not to be construed as limiting the scope of the invention in any manner.

DETAILED DESCRIPTION OF THE INVENTION

Figure 1:
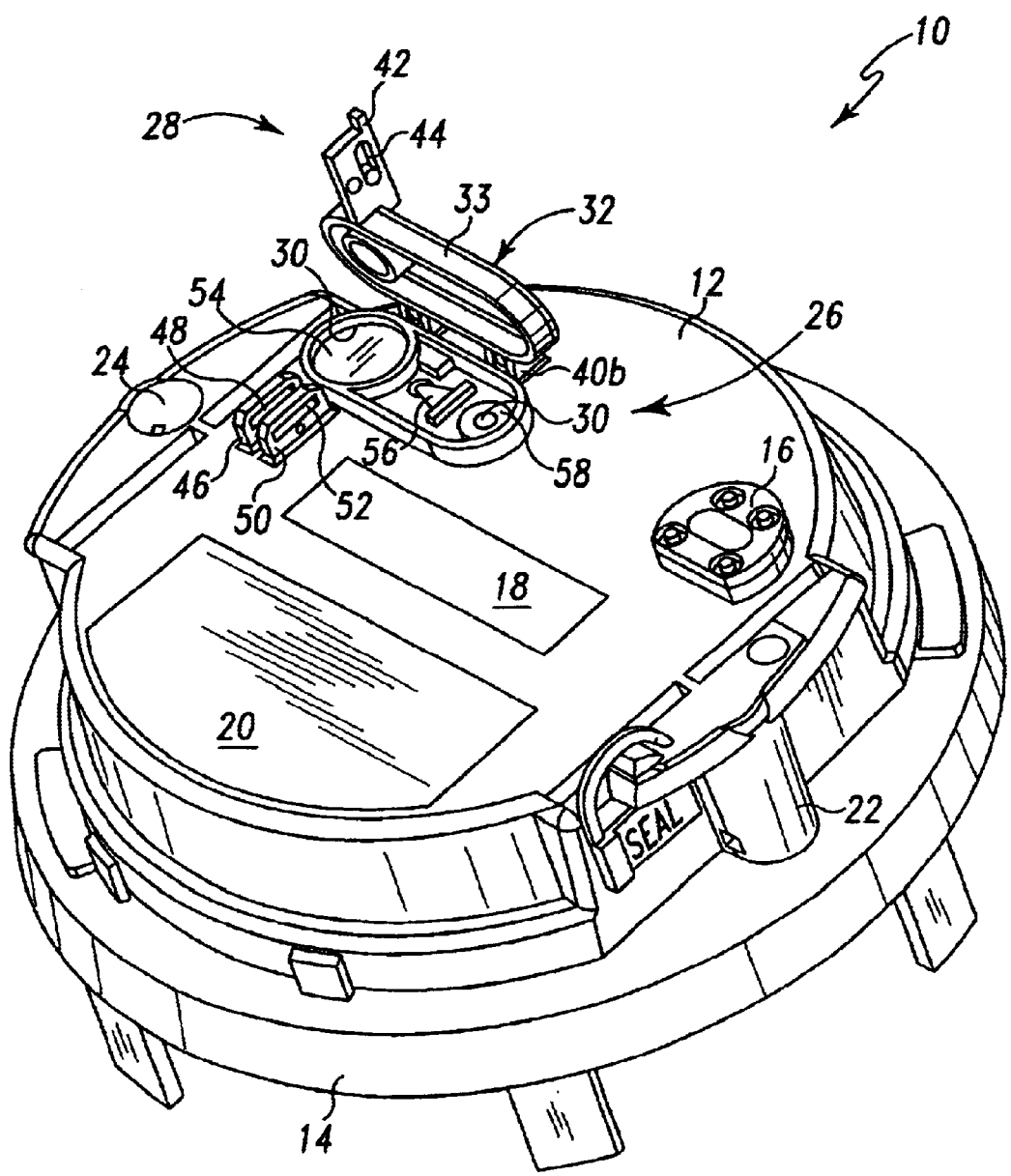
FIG. 1 is a perspective view of a utility meter embodying the present invention with the hatch thereof in an open position.
Figure 2:
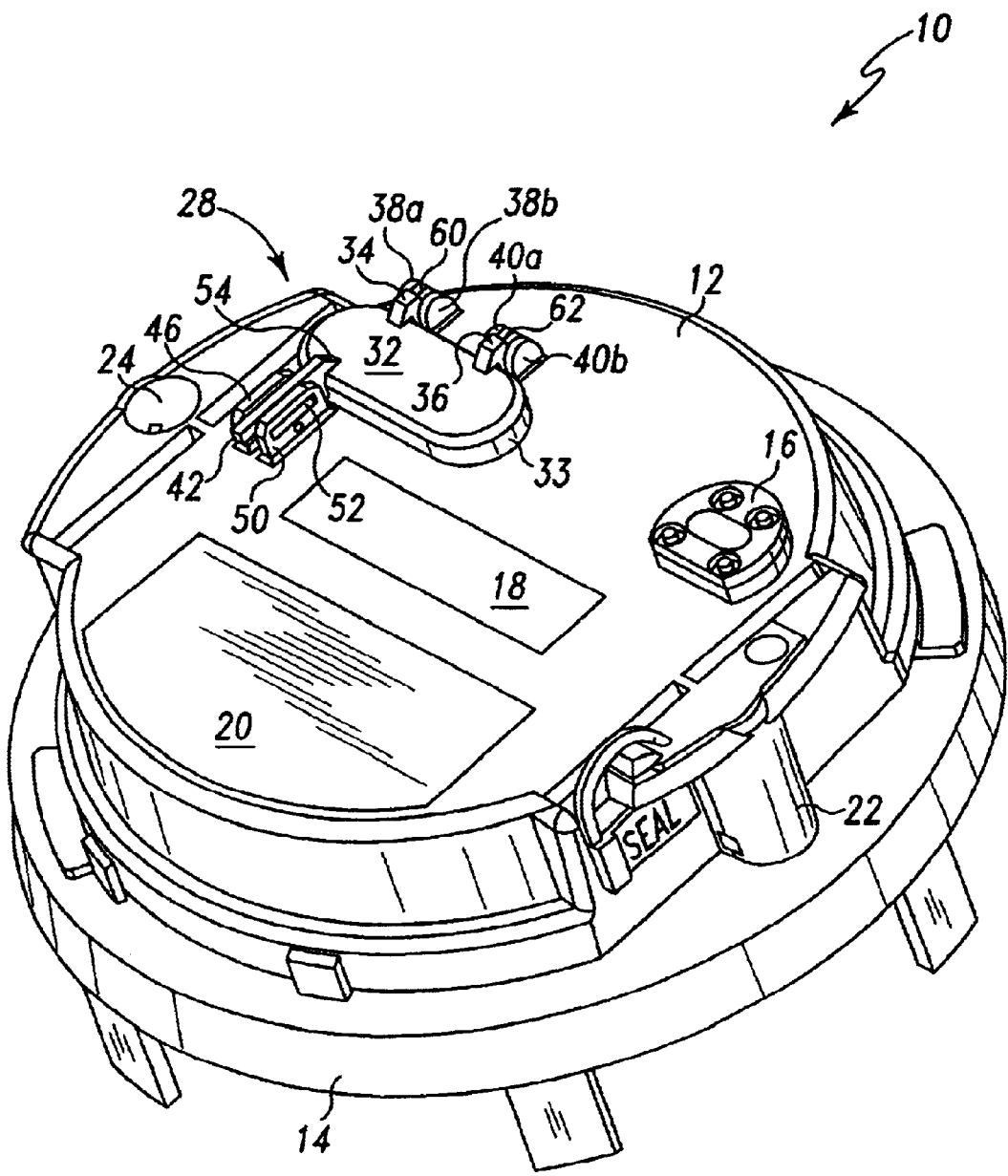
FIG. 2 is a perspective view of the utility meter of FIG. 1 with the hatch thereof in a closed position.

With reference now to FIGS. 1 and 2 there is depicted a utility meter 10. While utility meter 10 is depicted in FIGS. 1 and 2 as an electricity or watt-hour meter, and particularly a solid state electricity meter, it should be appreciated that the present invention is not limited to solid state electricity utility meters, but is applicable to all types of utility meters and thus hereafter will be termed "meter." The meter 10 includes a cover 12 that is received onto a base 14.

In general, the cover 12 and the base 14 house the meter circuitry. In the embodiment discussed herein, the cover 12 and a portion of the circuitry, not shown in FIG. 1, form a first removable module of the meter 10, while the base 14 and another portion of the circuitry, not shown, form a second module of the meter 10. The circuitry and modular construction of such a meter are described in further detail in U.S. Pat. No. 5,933,004 to Jackson et al., which is assigned to the assignee of the present invention and incorporated herein by reference.

However, it is noted that the cover 12 and base 14 may alternatively be a design in which the base 14 substantially houses all of the meter circuitry and the cover 12 is merely a protective cover that is placed over the base 14 and meter circuitry to inhibit tampering and environmental contamination.

In any event, the base 14 is configured to be mounted onto a structure such as a wall (not shown) via a mounting structure Suitable mounting structures are well known in the art. The cover 12 is received onto the base 14. In the exemplary embodiment described herein, the cover 12 is secured to the base 14, in part, by mounting structures 22 and 24, which may be adapted to receive screws or rivets, not shown. The base 14 and cover 12 :are preferably formed or molded from a suitable plastic such as is known in the art.

The meter 10 further includes an optical reader port 16 known to those skilled in the art for optically obtaining meter data from the meter 10 and/or transmitting data to the meter 10, a display 18 for displaying various meter data such as total watt-hours used and the like, and an information area 20 that typically indicates the manufacturer, meter type, and other printed data. As such, information area 20 may carry a sticker with various information as described above. It is noted that the cover 12 suitably includes at least a portion that is transparent to allow reading of the display 18.

While not shown, the meter 10 internally includes the necessary components and processing circuitry as are known in the art to measure the commodity (i.e. electricity) and to calculate or determine various quantities associated thereof. In the case of an electricity meter, the meter typically measures voltage and current per phase and calculates or determines such quantities as peak demand and total kilowatt hours used.

Figure 3:
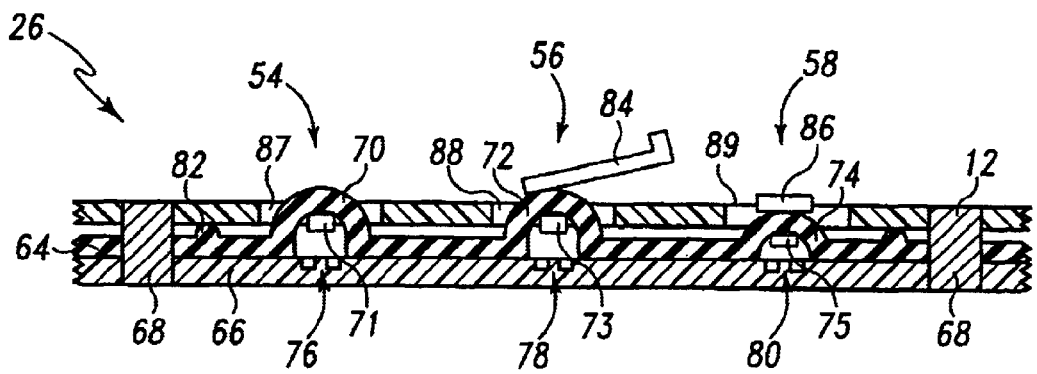
FIG. 3 is a side sectional view of the switch assembly.

In accordance with an aspect of the present invention, the cover 12 has one or more cutouts or openings 30 through which a switch assembly 26 is accessible. In the exemplary embodiment described herein, the cover 12 includes three openings 87, 88 and 89 as shown in FIG. 3. A hatch assembly 28 is situated about the switch assembly 26 and is adapted to allow selective access to the various switches of the switch assembly 26.

In particular, the hatch assembly 28 includes hatch 32 that is pivotally attached to the cover 12 in the following manner. With particular reference to FIG. 2, extending from hatch 32 are two arms 34 and 36 each of which has a hook shaped end. Projecting from the cover 12 is a first pivot structure defamed by spaced-apart tabs 38a and 38b and a pin 60 extending between the two tabs 38a and 38b. Projecting from the cover 12 is a second pivot structure defined by spaced apart tabs 40a and 40b and a pin 62 extending between the two tabs 40a and 40b. The first pivot structure receives the hooked end of the arm 34 while the second pivot structure receives the hooked end of the arm 36. This allows the hatch 32 to pivot between an open position as depicted in FIG. 1 and a closed position as depicted in FIG. 2. In the closed position, the rim 33 of the hatch 32 surrounds the switch assembly 26 within the opening 30 such that access to the switch assembly 26 is prevented. The open position, as depicted in FIG. 1, allows access to the switch assembly 26.

Access to the switch assembly 26 may be prevented by the closure of the hatch 32 and the locking thereof. Locking of the hatch 32 is accomplished in the following manner. The hatch 32 includes an extending arm 42 having a slot 44. As well, the cover 12 further includes a first projecting ear 46 having a slot 48, and a second projecting ear 50 having a slot 52. The first and second projecting ears 46 and 50 are spaced from each other by a distance that is essentially the same as the thickness of arm 42, and are positioned on the cover 12 such that upon closing the hatch 32, the arm 42 falls between the ears 46 and 50, and all of the slots 44, 48, and 52 align. A locking device, (not shown) may be placed through the slots 44, 48, and 52 to hold the arm 42 in place thereby preventing the hatch 32 from being opened. The locking device may suitably be a padlock-type device, or a wire with a plastic or lead seal or the like. Suitable locking devices are typically used to seal meter covers to meter bases and are thus well known.

As depicted in FIGS. 1 and 3, the switch assembly 26 includes a demand reset switch 54, a test mode switch 56, and a scroll switch 58. Each of the switches 54, 56 and 58 is preferably comprised of a button actuator (e.g. button actuator 70) and one or more electrical contacts or terminals (e.g. terminal pair 76) of the meter circuit, as discussed further below.

The demand reset switch 54 is preferably operable to clear or reset the maximum demand register once the contents have been read. In particular, the maximum demand register stores a peak demand value corresponding to the peak demand for the month or other time period. The meter 10, if in the "demand" mode, displays the peak demand on the display 18. When the utility technician completes the reading of the value for billing purposes, the technician actuates the demand reset switch 54 to clear the demand register value for the next billing cycle.

The test mode switch 56 is operable to select and/or actuate various test modes of the meter 10. As is known in the art, the meter 10 has one or more test modes in which a technician may verify the operation of the meter. The test mode switch 56 allows the technician to select and activate a test mode. Those of ordinary skill in the art may readily devise suitable test modes for their particular implementation.

The scroll switch 58 is operable to scroll through various metering data or information to be provided on the display 18. In particular, as is known in the art, the meter 10 is capable of measuring various energy-related quantities, such as watt-hours and VAR-hours, and peak demand periods. The display 18, however, does not constantly display all of the available information because of both a lack of space on the display 18 and a desire to restrict access to certain information. Accordingly, the scroll switch 58 allows a technician or other authorized person to access information not normally displayed. Those of ordinary skill in the art may readily devise their own particular implementation of the scroll switch 58.

Referring now to FIG. 3, there is shown the switch assembly 26 in greater detail. The switch assembly 26 includes a flexible button pad 64 that is preferably made of a suitable elastomeric material such as rubber. The pad 64 is retained between the cover 12 and a printed wiring board 66 by a plurality of fasteners 68. The fasteners 68 also assist in securing the printed wiring board to the cover 12.

In the exemplary embodiment described herein, the printed wiring board 66 houses at least a portion of the metering circuitry, not shown, of the meter 10. As discussed above, a portion of the metering circuitry and the cover 12 form a removable module. The printed wiring board 66 contains such metering circuitry and thus cooperates with the cover 12 to form such a removable module.

In any event, the cover 12 has three switch access openings 87, 88, and 89 through which button actuators 70, 72, and 74 of pad 64 extend. Of course, the number of button actuators, and therefore switches, of the button pad 64 and corresponding openings in the cover 12 are variable. There may be as little as one buttons/switch as well as in excess of three such button/switches.

Figure 4:
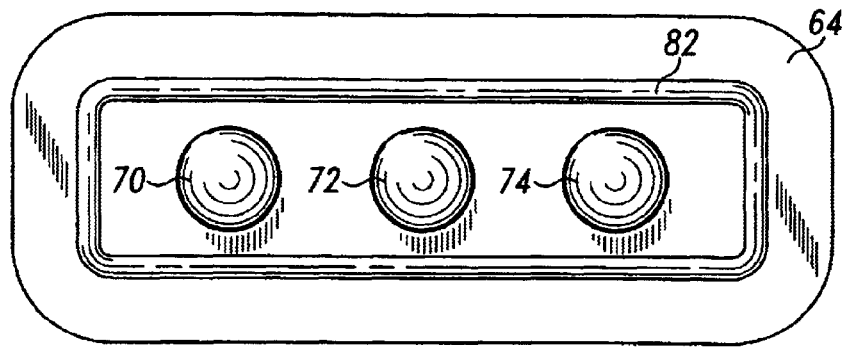
FIG. 4 is a top plan view of the elastomeric button pad.

As best seen in FIG. 4, pad 64 includes a rim or ridge 82 that surrounds or encompasses button actuators 70, 72, and 74. When pad 64 is sandwiched between the cover 12 and the printed wiring board 66, the rim 82 is compressed against the underside of the cover 12. The rim 82 provides a barrier against particles, moisture and the like entering into the meter 10, especially when the hatch 32 is open, when the switches are exposed to various environmental conditions.

Each button actuator 70, 72, and 74 of the pad 64 has a respective conductive disk 71, 73, and 75 attached to the underside thereof. The conductive disk 71, 73, and 75 may suitably consist of a carbon disk affixed to the elastomeric button pad 64. Each conductive disk 71, 73, and 75 is disposed above respective pairs of contacts or terminals 76, 78, and 80 of the printed wiring board 66. Each pair of terminals 76, 78, and 80 is coupled to appropriate circuitry (not shown) of the meter circuitry (not shown) to effectuate the appropriate function of the button/switch when a circuit is completed between a pair of terminals. A circuit is completed between a pair of terminals (i.e. terminal pairs 76, 78, 80) when a carbon disk (i.e. carbon disks 71, 73, 75) makes contact therewith when any of the button actuators 70, 72, and 74 is depressed. Thus, each of the button actuators 70, 72, and 74 and its corresponding terminal pair 76, 78, and 80 form one of the switches 54, 56 and 58. In the case of button actuator 70 (the "demand reset" switch 54) manual depressing of the button actuator 70 will cause the conductive disk 71 to contact the terminal pair 76 to complete the circuit. In the case of the button actuator 72 (the "mode selection" switch 56), a lever 84 is positioned over the button actuator 72 such that appropriate movement of the lever 84 causes the button actuator 72 to be depressed and the conductive disk 73 to contact the terminal pair 78 to complete the circuit. In the case of the button actuator 74 (the "scroll" switch 58), a plunger or disk 86 is disposed thereover such that depressing the plunger 86 will depress the button actuator 74 such that the conductive disk 75 is caused to contact the terminal pair 80 to complete the circuit.

Figure 5:
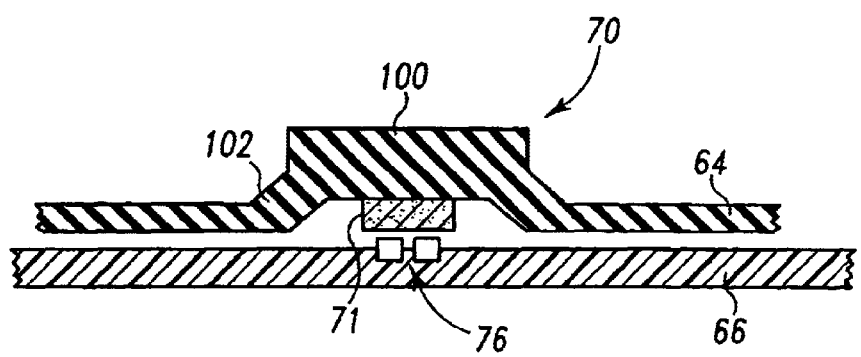
FIG. 5 is a side sectional view of one of the push buttons of the elastomeric button pad as it relates to the printed wiring board.

With particular attention to FIG. 5, the operation of the switch 54 will be described in greater detail. It should be appreciated that while only one button actuator 70 and terminal pair 76 is shown in FIG. 5, such single representation is representative of the switches 56 and 58 as well. In FIG. 5, the printed wiring board 66 includes a terminal pair (contacts) 76 that is coupled to appropriate meter circuitry (not shown). The button pad 64 is situated over the printed wiring board 66. A button actuator 70 on the button pad 64 is formed by a crown portion 100 and annular connecting neck 102. The carbon disk 71 is disposed on the underside of the crown 100, above the contacts 76. The annular connecting neck 102 tapers inward from the end and nearest the contacts 76 to the end nearest the crown portion 100. The annular connecting neck is rigid enough to normally retain the button actuator 70, and thus the carbon disk 71, above the contacts 76 such that the switch is normally open. However, when the button actuator 70 is depressed, the neck 102 will collapse allowing the carbon disk 71 to contact the contacts 76 and complete the circuit. Upon releasing pressure against the button actuator 70, the resiliency of the neck 102 will cause the button actuator 70 to return to the normally open position as depicted.

It is noted that while the above embodiment of the present invention is implemented in a modular meter in which the printed wiring board 66 and the cover 12 form a removable module and the base 14 forms a separate module, the present invention may readily be implemented in non-modular designs in which the base 14 houses all of the circuitry. In such an embodiment, it would be preferable to secure the elastomeric pad 64 to the cover 12 to ensure a sound fit therebetween. The printed wiring board 66 would then be disposed in the base 14 such that when the cover 12 was secured to the base 14, the carbon disks 71, 73 and 75 are aligned directly above the contacts 76, 78 and 80, respectively.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

For example, the exact number of button actuators employed in the meter is a matter of implementation choice and will depend upon the functionality provided by the meter. It is noted, however, that switches for controlling demand meter capability, display scrolling capability, and test mode generation, are considerably more convenient if externally accessible by metering personnel. In addition, any number of terminals or contacts may be connected by actuation of a single button actuator. For example, a button actuator may be configured to connect multiple terminal pairs wherein the terminal pairs are electrically isolated from each other.

Moreover, while the printed wiring board 66 is discussed herein as including metering circuitry, the printed wiring board 66 need not include such circuitry. The printed wiring board 66 may include only the contacts 76, 78 and 80 (or less if less than three switches are implemented). Indeed, many of the advantages of the present invention may be realized even if the contacts are affixed to a substrate other than a printed wiring board. Nevertheless, incorporation of the contacts 76, 78 and 80 on the printed wiring board 66 achieves further parts and labor reduction in the assembly of the meter 10.

What is claimed is:

1. An arrangement for providing external access to functionality switches in a utility meter, the utility meter including a base, the arrangement comprising:
   a cover adapted to connect to the base to form a housing, the cover having at least one switch access opening;
   a number of contacts disposed on a substrate, the substrate adapted to be disposed between the cover and the base;
   at least one pushbutton actuator configured to electrically connect at least two of said number of contacts, said at least one pushbutton actuator accessible via said at least one switch access opening; and
   a hatch disposed on said cover and adapted to selectively provide external access to said at least one switch access opening.

2. The arrangement of claim 1, further comprising a plurality of pushbutton actuators configured to electrically connect a plurality of said number of contacts, said plurality of pushbutton actuators accessible through said at least one switch access opening.

3. The arrangement of claim 1, wherein said hatch is pivotally attached to said cover.

4. The arrangement of claim 1, wherein said hatch is lockable to prevent unauthorized access to said at least one pushbutton actuator.

5. The arrangement of claim 2, wherein said plurality of pushbutton actuators and said number of contacts cooperate to form a demand reset switch, a test mode switch, and a scroll switch.

6. The arrangement of claim 1, wherein said at least one pushbutton actuator includes a conducting disk adapted to electrically connect at least two of said number of contacts.

7. The arrangement of claim 1, wherein said at least one pushbutton actuator is formed by an elastomeric button pad.

8. The arrangement of claim 7, wherein said elastomeric pushbutton actuator is integrally formed with a button pad that includes a sealing ridge surrounding said at least one pushbutton actuator.

9. The arrangement of claim 1, wherein said substrate comprises a printed wiring board, the printed wiring board secured to the cover.

10. An arrangement for providing external access to functionality switches in a utility meter, the arrangement comprising:
    a housing having a base and a cover, said cover having at least one switch access opening;
    a wiring board disposed between said cover and said base, said wiring board having a number of contacts thereon; and
    an elastomeric button pad disposed between said cover and said wiring board, said button pad defining a button actuator accessible via said access opening, said button actuator disposed over a pair of said number of contacts and defining a switch therewith.

11. The arrangement of claim 10, further comprising a hatch selectively positionable over said access opening.

12. The arrangement of claim 10, wherein said switch comprises a meter function switch.

13. The arrangement of claim 10, wherein said hatch is pivotally attached to said cover.

14. The arrangement of claim 12, wherein said hatch is lockable to prevent unauthorized access to said switch.

15. The arrangement of claim 9, wherein said button actuator includes a conducting disk adapted to contact said terminal pair upon pressing of the button actuator.

16. The arrangement of claim 9, wherein said elastomeric button pad includes a sealing ridge surrounding said button actuator.

17. An arrangement for providing external access to functionality switches in an electricity meter, the electricity meter having a base, the arrangement comprising:
    a cover adapted to be coupled to said base, said cover having an access opening therein;
    a printed wiring board having a plurality of contacts and adapted to be disposed between said base and said cover;
    an elastomeric button pad having at least one button actuator thereon and disposed over said printed wiring board such that each button actuator is adjacent at least two of said plurality of contacts to form a switch therewith, each button actuator having a contact pad adapted to electrically couple the respective at least two of the plurality of contacts upon depressing the respective button actuator, said elastomeric button pad further includes a sealing ridge disposed about said at least one button actuator; and
    a hatch pivotally disposed on said cover and adapted to selectively cover said access opening.

18. The arrangement of claim 16, wherein said elastomeric button pad further comprises a plurality of button actuators, and wherein said plurality of button actuators and said plurality of contacts form a plurality of switches.

19. The arrangement of claim 16, wherein said hatch is lockable to inhibit unauthorized access to said at least one button actuator.

20. The arrangement of claim 17, wherein said plurality of switches comprises a demand reset switch, a test mode switch, and a scroll switch.

21. An arrangement for providing external access to functionality switches in an electricity meter, the electricity meter having a base, the arrangement comprising:
    a cover adapted to be coupled to said base, said cover having at least one access opening therein;
    a printed wiring board having a number of contacts thereon and adapted to be disposed between said cover and said base; and
    at least one button actuator operable to electrically connect at least two of said number of contacts, said button actuator being accessible through said at least one access opening.

22. The arrangement of claim 20, wherein the number of contacts comprises a terminal pair.

23. The arrangement of claim 20, further comprising a hatch disposed on said cover and adapted to selectively provide external access to said switch opening.

* * * * *